Patented Aug. 30, 1949

2,480,520

UNITED STATES PATENT OFFICE 2,480,520

ACTIVATED ALUMINA-BERYLLIUM OXIDE CATALYST

Carlisle M. Thacker, Petersburg, Va., assignor to The Pure Oil Company, Chicago, Ill., a corporation of Ohio No Drawing. Original application December 26, 1942, Serial No. 470,302. Divided and this application February 14, 1947, Serial No. 728,731

5 Claims. (Cl. 252—463)

This invention relates to catalysts and catalytic compositions, and particularly to a supported catalyst for use in the catalytic processes for the dehydrogenation of hydrocarbons.

This application is a division of my application Serial No. 470,302 filed December 26, 1942, now U. S. Patent No. 2,469,420, issued May 10, 1949, which application in turn is a continuation-in-part of my application Serial No. 180,531 filed December 18, 1937, which issued August 1, 1944, as United States Patent 2,354,892.

It is an object of this invention to provide a catalyst composition which is easily prepared from materials readily available in the art.

Other objects and advantages of the invention will in part be obvious and in part appear hereinafter.

In accordance with my invention the catalyst is prepared using activated alumina as a base, and is impregnated with an oxide of a metal from the second group of the periodic table, which group consists of beryllium, magnesium and zinc. The catalyst, when prepared in the manner to be described below from the ingredients in the proportions recommended, is particularly advantageous for the dehydrogenation of hydrocarbons having two or more carbon atoms in the molecule as exemplified by ethane, propane, butane or corresponding olefins, and such higher-boiling hydrocarbons as hexane, heptane and octane. In general the catalyst will be used when it is heated to a red heat, or about 600° C., as a preferred operating range, although it is effective in a temperature range from 350°–750° C.

The activated alumina base on which the catalyst oxide is dispersed and on which it is carried when in use can be prepared by precipitating aluminum hydroxide from an alkali metal aluminate solution and calcining the precipitate at an elevated temperature within the range from about 350°–800° C. The methods for the preparation of activated alumina are set forth in detail in United States Patent 1,868,869 to Barnitt, and 2,015,593 to Durr. The activated alumina suitable for carrying the catalytic oxide may be freshly prepared, or it may be a commercial activated alumina having essentially the same physical and chemical characteristics and activity as the freshly prepared product.

The preferable method of preparing the catalyst according to my invention is to impregnate the aluminum oxide support with a solution of a salt of the catalyst metal it is desired to use, employing a concentration of solution and a moderate support which will give the desired proportion of catalyst oxide dispersed on the support when the salt is decomposed. In general it will be found that the nitrates of the catalyst metals are the most convenient to use because they decompose readily and leave behind the oxide. The catalyst base wet with the solution of the catalyst metal is dried and calcined at a temperature which will cause it to reach red heat, or about 600°–800° C., at which temperature the nitrate will be decomposed to the metal oxide. Prior to its being used in a catalytic operation, the catalyst thus prepared is heated in the presence of hydrogen or an inert gas at an elevated temperature for several hours in order to activated the catalyst.

The following specific examples will be typical methods of preparing catalysts which correspond to typical embodiments of my invention:

Example I

An aqueous solution containing 36.7 grams of beryllium nitrate ($Be(NO_3)_2.3H_2O$) in 225 cc. of water and 125 cc. of concentrated nitric acid was added to 8–14 mesh activated alumina of commerce which had previously been heated for 2½ hours to 200° F. The mixture was heated on a water bath with frequent stirring until almost dry, and then the nitrate was decomposed in a current of air in a heating cycle including gradually heating the catalyst over a period of 4½ hours from 20° to 186° C., 13 hours from 186° to 276° C., 3 hours from 210° to 400° C., and then for 5 hours at a temperature slightly above 400° C.

Example II

An aqueous solution containing 58.3 grams of zinc nitrate ($Zn(NO_3)_2.6H_2O$) in 250 cc. of water was added to 400 grams of 8–14 mesh activated alumina of commerce which had been heated in an electric oven for 2 hours at 130° C. The mixture was thoroughly stirred and evaporated to a small volume over a small bunsen flame and finally dried in an electric oven at 130° C. The dried catalyst was treated with a solution consisting of 300 cc. of water and 30 cc. of concentrated ammonium hydroxide. After standing for 40 hours, the solution was filtered and the catalyst washed 5 times with 300 cc. of distilled water per wash, and then dried at 120° C.

Example III

An aqueous solution containing 40.3 grams of magnesium nitrate ($Mg(NO_3)_2.6H_2$) in 250 cc. of water solution was added to 8–14 mesh activated alumina of commerce which had been dried for 30 minutes in an electric oven at 130° C. The mixture was frequently stirred while being evaporated almost to dryness in the water bath and the drying was completed in the electric oven at 130° C. The catalyst was then covered with 6 normal ammonium hydroxide and allowed to stand one week. The mixture was filtered and washed 6 times with 300 cc. of boiling water per wash after which it was dried in an electric oven at 105° C.

Example IV

An aqueous solution made up of 16.5 grams of magnesium carbonate dissolved in an excess of aqueous acetic acid to make 196 cc. of solution was used to impregnate 400 grams of 8–14 mesh activated alumina of commerce in the same manner as used in the preparation set forth in Example III, with the exception that the ammonium hydroxide treatment was omitted.

In dehydrogenating lower boiling hydrocarbons, higher operating temperatures are generally required than are necessary with the higher boiling hydrocarbons. For example, in the dehydrogenation of ethane temperatures above 600° C. are necessary to obtain substantial yields, whereas in the case of butane temperatures of the order of 550° C. will give satisfactory yields of unsaturated $C_4$ hydrocarbons. If it is desired to dehydrogenate a mixture of hydrocarbons, the optimum temperature will depend upon the relative proportions of the several constituents in the mixture, but in any case will lie somewhere between the lowest and highest optimum temperatures for the individual constituents. The process employing the catalyst may be carried out in conventional apparatus at atmospheric, sub-atmospheric or super-atmospheric pressures. However, where it is desired to dehydrogenate paraffins or olefins to diolefins, sub-atmospheric pressures should be used and steam or other non-reactant gas or vapor should be mixed with the charging stock in order to lower the partial pressure of the hydrocarbons to be dehydrogenated. It is preferable to heat the charging stock to conversion temperature prior to charging it to the reactor containing the catalyst and the reactor is preferably heated to maintain it at all times at conversion temperature. When dehydrogenating paraffins to olefins the presence of large quantities of water vapor should be avoided since water vapor when present in excessive amounts lowers the activity of the catalyst, although small amounts are not harmful. I have found that gas saturated with water vapor at 0° C. is not harmful whereas the same gas saturated with water vapor at room temperature is decidedly deleterious.

Although in the specific examples previously given the catalysts were prepared by using a molal ratio of activated alumina to metal of 20 to 1, this ratio may vary over wide limits. The content of metal, deposited as metal oxide on the activated alumina, may vary from 0.5 to 30 per cent by weight of the activated alumina. Amounts of oxide ranging from about 0.5 or 1 to 10 per cent calculated as metal are preferred.

Catalysts herein described are especially useful in the dehydrogenation of butane or butene, or mixtures thereof, to butadiene under conditions of sub-atmospheric pressure, or at a low partial pressure of the reactant gas.

What is claimed is:

1. A catalyst consisting of activated alumina and 0.5 to 10 per cent of its weight of beryllium as beryllium oxide.

2. A catalyst composed essentially of activated alumina carrying a catalytically effective amount of beryllium oxide.

3. A catalyst composed essentially of activated alumina carrying an amount of beryllium oxide sufficient to enhance the dehydrogenation catalytic activity of the activated alumina.

4. A catalyst composed essentially of activated alumina carrying a catalytically effective amount of beryllium oxide in the range from about 0.5 to 30.0 per cent of its weight of beryllium.

5. A catalyst composed essentially of activated alumina carrying a catalytically effective amount in the range from about 0.5 to 10.0 per cent of its weight of beryllium as oxide.

CARLISLE M. THACKER.

REFERENCES CITED

The following references are of record in the file of this patent:

UNITED STATES PATENTS

| Number | Name | Date |
| --- | --- | --- |
| 1,755,193 | Schlect | Apr. 22, 1930 |
| 2,118,001 | Andrews | May 17, 1938 |
| 2,131,089 | Beeck et al. | Sept. 27, 1938 |
| 2,279,198 | Huppke | Apr. 7, 1942 |
| 2,289,757 | Connolly | July 14, 1942 |
| 2,354,892 | Thacker | Aug. 1, 1944 |